Nov. 17, 1925.  1,562,319
H. K. FAIRALL
GOGGLES
Filed Sept. 30, 1922
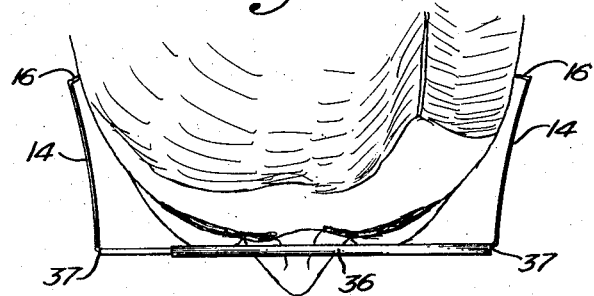
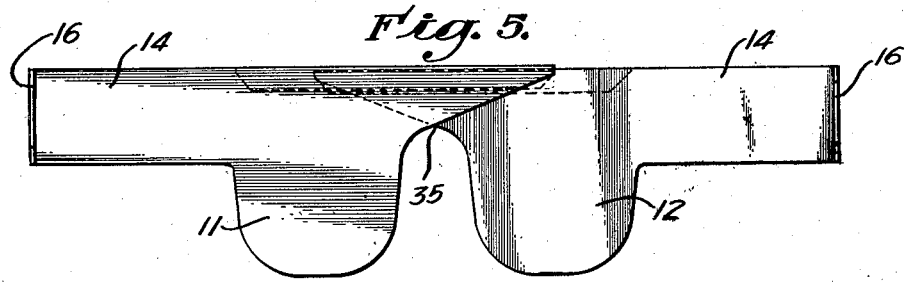
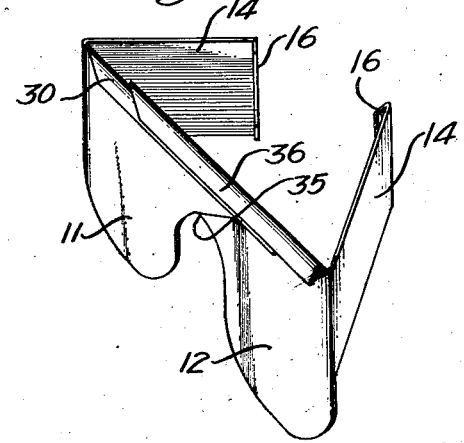
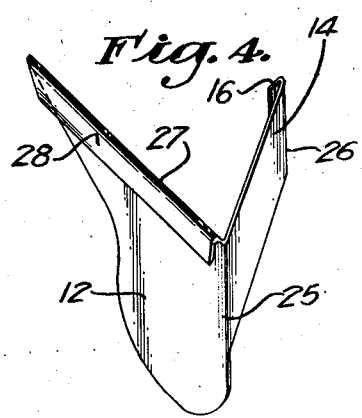
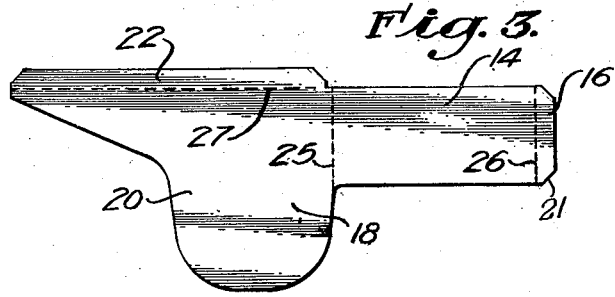
INVENTOR:
HARRY K. FAIRALL,
BY
ATTORNEYS.

Patented Nov. 17, 1925.

1,562,319

UNITED STATES PATENT OFFICE.

HARRY K. FAIRALL, OF LOS ANGELES, CALIFORNIA.

GOGGLES.

Application filed September 30, 1922. Serial No. 591,530.

*To all whom it may concern:*

Be it known that I, HARRY K. FAIRALL, a citizen of the United States, residing at Los Angeles, in the county of Los Angeles, State of California, have invented new and useful Goggles, of which the following is a specification.

My invention relates to viewing devices and relates particularly to an improved and simplified form of goggles which have a wide variety of uses but which are of particular utility in the viewing of stereoscopic motion pictures.

It is an object of the invention to provide goggles which may be manufactured from transparent resilient material, such as celluloid, and which have retaining means integrally formed therewith for gripping the temples of a person wearing same, in such a manner as to be held securely in place.

It is a further object of the invention to provide goggles of this character which may be easily equipped with different colored lenses.

The especial advantages of the invention and further objects thereof will be made evident hereinafter.

Referring to the drawing which is for illustrative purposes only:

Fig. 1 is a perspective view of a pair of goggles embodying the features of my invention.

Fig. 2 is a view illustrating the manner in which the goggles are worn.

Fig. 3 is a view of a stamping which is employed in forming the goggles shown in Fig. 1.

Fig. 4 is a perspective view of this stamping after having been bent preparatory to combination with a correspondingly stamped member to form the completed goggles shown in Fig. 1.

Fig. 5 shows the manner in which a pair of such stampings are placed together with the bow reinforcing channel of one stamping placed within the bow reinforcing channel of the other stamping.

The goggles shown in Fig. 1 provide lens portions or screens 11 and 12 having temple members 14 extending therefrom, these temple members being provided with inwardly bent ends 16 which are provided for a purpose which will hereinafter be made evident.

For the purpose of viewing stereoscopic motion pictures it is desirable that the screens 11 and 12 be of different colors in order to serve as color screens. In order that these lenses may be provided in different colors I construct the goggles from two separate stampings such as are shown at 18 in Fig. 3. The stampings 18 shown in Fig. 3 provides an area 20 from which extends a portion forming a temple member 14 having the corners beveled as shown at 21, and along the upper edge of the area 20 a strip 22 extends. The stamping 18 is bent in the following manner:

The portion 14 is bent rearwardly upon the line 25 so that it assumes the angular relationship to the screen 12, as shown in Fig. 4. The end of the member 14 is then bent inwardly upon the line 26, and the strip 22 bent downwardly upon the line 27, as shown at 28 in Fig. 4. By bending down the strip 22 a reinforcement of the member 18 is accomplished, which in combination with the vertical bend at 25 has a tendency to maintain the screen portion 12 sufficiently rigid for practical use. A similar stamping 18 has the temple portion 14 thereof bent rearwardly as shown in Fig. 1 and the edge strip 22 thereof bent downwardly as indicated at 30, thus providing a pair of cooperating members which are attached together as shown in Fig. 5 by placing the downwardly turned edge 22 of one of the formed up stampings 18 within the downwardly turned edge of the other stamping, and with the suitable application of cement, securing these two members together in the form shown in Fig. 1. When the two stampings are cemented together, the downwardly turned edges 22 form a rigid bow across the top of the goggles.

It will be perceived from Fig. 1 that in forming the members from which the goggles are made, the temple members 14 are inclined inwardly. In putting on the goggles, as shown in Fig. 2, the temple members are flexed outwardly and slipped back over the temples and the inwardly bent ends 16 are allowed to come to rest against the temples of the wearer, thus holding the goggles in place. The stampings are so formed that when placed together they provide a bridge 35 as shown in Figs. 1 and 5 which rests upon the bridge of the nose. The overlapping downwardly bent strips 22 of each of the stampings constitute a reinforcing bar 36 which extends entirely across the front of the goggles and prevents the ends 37 thereof being flexed backwardly in putting on the goggles. Being constructed of celluloid or some other similar transparent material, goggles formed in this manner are of extremely light weight and therefore require but little pressure of the temple members 14, upon the temples of the wearer, to hold them in place.

I claim as my invention:

1. Goggles of the class described, comprising; a pair of lenses formed of transparent material; means joining said lenses together; and temple members formed integrally with said lenses extending rearwardly from said lenses, said temple members being resiliently maintained against the temples of the wearer for the purpose of providing a grip for holding said goggles in place.

2. Goggles, as in claim 1, in which said temple members have inwardly turned ends for engaging the temples.

3. Goggles, as in claim 1, in which said means joining said lenses together is integrally formed with said lenses of the same material.

4. Goggles, as in claim 3, having a reinforcing member extending across the upper edges of said lenses, said reinforcing member being integrally formed with said lenses.

5. Goggles, as in claim 4, in which said temple members have inwardly turned ends.

6. Goggles of the class described, comprising a pair of members each made from transparent resilient material in a form providing a lens portion, an inwardly extending bridge portion, and an outwardly extending temple portion having an inwardly bent end, said members being joined in the form of goggles by attaching together said inwardly extending bridge portions.

7. Goggles, as in claim 6, having the upper edge of each of said lens and bridge portions bent at an angle to said portions, for providing a reinforcement.

8. Goggles of the class described, comprising: lens portions adjacently arranged; and temple portions formed integrally with said lens portions, extending rearwardly therefrom and adapted to resiliently engage the head of the wearer to hold the goggles in place.

9. Goggles of the class described comprising: lens portions adjacently arranged; temple portions formed integrally with said lens portions and extending rearwardly therefrom; and inwardly bent portions formed at the rearward ends of said temple portions.

10. Goggles of the class described formed of a pair of similar shaped members interlocked together, each of said members comprising a lens portion and a temple portion formed integral with said lens portion, extending rearwardly therefrom and adapted to resiliently engage the head of the wearer.

11. Goggles of the class described formed of a pair of similar shaped members each comprising a lens portion and a temple engaging portion extending rearwardly therefrom, each of said lens portions provided with a channel shaped edge for interlocking said members.

12. Goggles of the class described formed of a pair of similar shaped members each comprising a lens portion and a temple engaging portion extending rearwardly therefrom adapted to resiliently engage the head of the wearer, and each of said lens portions provided with a channel shaped edge whereby said members may be adjustably locked together.

In testimony whereof, I have hereunto set my hand at Los Angeles, California, this 20th day of September, 1922.

HARRY K. FAIRALL.